(12) United States Patent
Tang et al.

(10) Patent No.: US 9,115,569 B2
(45) Date of Patent: Aug. 25, 2015

(54) REAL-TIME CASING DETECTION USING TILTED AND CROSSED ANTENNA MEASUREMENT

(75) Inventors: Yumei Tang, Tomball, TX (US);
Michael S. Bittar, Houston, TX (US);
Shanjun Li, Katy, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 464 days.

(21) Appl. No.: 13/549,679

(22) Filed: Jul. 16, 2012

(65) Prior Publication Data

US 2012/0283952 A1 Nov. 8, 2012

Related U.S. Application Data

(63) Continuation-in-part of application No. 13/116,150, filed on May 26, 2011, now Pat. No. 8,749,243.

(60) Provisional application No. 61/357,324, filed on Jun. 22, 2010.

(51) Int. Cl.
*E21B 47/022* (2012.01)
*G01V 3/26* (2006.01)

(52) U.S. Cl.
CPC ......... *E21B 47/02216* (2013.01); *E21B 47/022* (2013.01); *G01V 3/26* (2013.01)

(58) Field of Classification Search
CPC .... E21B 47/02216; E21B 47/022; G01V 3/26
USPC ......... 324/324–375; 166/254.2, 255.1, 255.2; 702/6, 7, 11, 13
See application file for complete search history.

(56) References Cited

U.S. PATENT DOCUMENTS 3,406,766 A 10/1968 Henderson
4,072,200 A 2/1978 Morris et al.
(Continued)

FOREIGN PATENT DOCUMENTS

AU 2011202215 5/2013
AU 2011202518 5/2013
(Continued)

OTHER PUBLICATIONS

Halliburton Energy Services, Inc, "PCT Application", dated Feb. 7, 2012, Appl No. Unknown, "Signal Processing Methods for Steering to an Underground Target", filed Unknown, 46 pgs.
(Continued)

*Primary Examiner* — Huy Q Phan
*Assistant Examiner* — Raul Rios Russo
(74) *Attorney, Agent, or Firm* — Krueger Iselin LLP; Alan Bryson

(57) ABSTRACT

Methods and apparatus for detecting nearby conductors such as pipes, well casing, etc., from within a borehole. A nearby casing string can be detected by transmitting an electromagnetic signal from a transmit antenna on a downhole logging tool and measuring a parallel response signal with a first receive antenna parallel to the transmit antenna and a perpendicular response signal with a second receive antenna perpendicular to the transmit antenna, both receive antennas on the downhole logging tool. As the tool rotates, the transmitting and measuring are repeated to determine the azimuthal dependence of the parallel and perpendicular response signals. The azimuthal dependence is analyzed to determine a diagonal component of said azimuthal dependence for each response signal. Distance to a casing string can be estimated using the diagonal component of each response signal. At least one of the antennas is preferably tilted.

20 Claims, 9 Drawing Sheets

(56) References Cited

U.S. PATENT DOCUMENTS

| | | |
|---|---|---|
| 4,224,989 A | 9/1980 | Blount |
| 4,443,762 A | 4/1984 | Kuckes |
| 4,458,767 A | 7/1984 | Hoehn, Jr. |
| 4,502,010 A | 2/1985 | Kuckes |
| 4,593,770 A | 6/1986 | Hoehn, Jr. |
| 4,700,142 A | 10/1987 | Kuckes |
| 4,791,373 A | 12/1988 | Kuckes |
| 4,845,434 A | 7/1989 | Kuckes et al. |
| 5,138,313 A | 8/1992 | Barrington |
| 5,200,705 A | 4/1993 | Clark et al. |
| 5,339,036 A | 8/1994 | Clark et al. |
| 5,343,152 A | 8/1994 | Kuckes |
| 5,358,050 A | 10/1994 | Schmidt |
| 5,389,881 A | 2/1995 | Bittar et al. |
| 5,541,517 A | 7/1996 | Hartmann |
| 5,676,212 A | 10/1997 | Kuckes |
| 5,720,355 A | 2/1998 | Lamine et al. |
| 5,892,460 A * | 4/1999 | Jerabek et al. ............. 340/856.4 |
| 6,098,727 A | 8/2000 | Ringgenberg et al. |
| 6,163,155 A | 12/2000 | Bittar |
| 6,191,586 B1 | 2/2001 | Bittar |
| 6,218,842 B1 | 4/2001 | Bittar |
| 6,257,334 B1 | 7/2001 | Cyr |
| 6,353,321 B1 | 3/2002 | Bittar |
| 6,359,438 B1 | 3/2002 | Bittar |
| 6,405,136 B1 | 6/2002 | Li et al. |
| 6,476,609 B1 | 11/2002 | Bittar |
| 6,538,447 B2 | 3/2003 | Bittar |
| 6,810,331 B2 | 10/2004 | Bittar et al. |
| 6,885,943 B2 | 4/2005 | Bittar et al. |
| 6,911,824 B2 | 6/2005 | Bittar |
| 6,934,635 B2 | 8/2005 | Kennedy |
| 6,944,546 B2 | 9/2005 | Xiao et al. |
| 6,985,814 B2 | 1/2006 | McElhinney |
| 7,019,528 B2 | 3/2006 | Bittar |
| 7,038,455 B2 | 5/2006 | Beste et al. |
| 7,046,010 B2 | 5/2006 | Hu et al. |
| 7,098,664 B2 | 8/2006 | Bittar et al. |
| 7,098,858 B2 | 8/2006 | Bittar et al. |
| 7,133,779 B2 | 11/2006 | Tilke et al. |
| 7,138,803 B2 | 11/2006 | Bittar |
| 7,171,310 B2 | 1/2007 | Haugland |
| 7,227,363 B2 | 6/2007 | Gianzero et al. |
| 7,265,552 B2 | 9/2007 | Bittar |
| 7,268,019 B2 | 9/2007 | Golla et al. |
| 7,301,223 B2 | 11/2007 | Rodney et al. |
| 7,345,487 B2 | 3/2008 | Bittar et al. |
| 7,382,135 B2 | 6/2008 | Li et al. |
| 7,427,863 B2 | 9/2008 | Bittar |
| 7,557,579 B2 | 7/2009 | Bittar |
| 7,557,580 B2 | 7/2009 | Bittar |
| 7,659,722 B2 | 2/2010 | Bittar |
| 7,746,078 B2 | 6/2010 | Bittar et al. |
| 7,825,664 B2 | 11/2010 | Homan et al. |
| 7,839,148 B2 | 11/2010 | Vehra et al. |
| 7,839,346 B2 | 11/2010 | Bittar et al. |
| 7,948,238 B2 | 5/2011 | Bittar |
| 7,982,464 B2 | 7/2011 | Bittar et al. |
| 8,016,053 B2 | 9/2011 | Menezes et al. |
| 8,026,722 B2 | 9/2011 | McElhinney |
| 8,030,937 B2 | 10/2011 | Hu et al. |
| 8,085,049 B2 | 12/2011 | Bittar et al. |
| 8,085,050 B2 | 12/2011 | Bittar et al. |
| 8,174,265 B2 | 5/2012 | Bittar et al. |
| 8,844,648 B2 | 9/2014 | Bittar et al. |
| 2002/0101242 A1 | 8/2002 | Bittar |
| 2003/0055565 A1 | 3/2003 | Omeragic |
| 2004/0019427 A1 | 1/2004 | San Martin et al. |
| 2005/0024060 A1 | 2/2005 | Bittar |
| 2005/0134280 A1 | 6/2005 | Bittar et al. |
| 2005/0140373 A1* | 6/2005 | Li et al. ............. 324/338 |
| 2006/0022887 A1 | 2/2006 | Bittar |
| 2006/0033502 A1* | 2/2006 | Bittar ............. 324/336 |
| 2006/0244455 A1 | 11/2006 | Bittar |
| 2006/0255811 A1 | 11/2006 | Bittar et al. |
| 2007/0075455 A1 | 4/2007 | Marini |
| 2007/0126426 A1 | 6/2007 | Clark et al. |
| 2007/0205021 A1 | 9/2007 | Pelletier et al. |
| 2007/0235225 A1 | 10/2007 | Bittar |
| 2008/0078580 A1 | 4/2008 | Bittar |
| 2008/0315884 A1 | 12/2008 | Bittar et al. |
| 2009/0015260 A1 | 1/2009 | Bittar et al. |
| 2009/0164127 A1* | 6/2009 | Clark ............. 702/7 |
| 2009/0179647 A1* | 7/2009 | Wang et al. ............. 324/339 |
| 2009/0224764 A1 | 9/2009 | Bittar |
| 2009/0229826 A1 | 9/2009 | East, Jr. et al. |
| 2009/0230968 A1 | 9/2009 | Bittar et al. |
| 2009/0302851 A1 | 12/2009 | Bittar et al. |
| 2009/0309600 A1* | 12/2009 | Seydoux et al. ............. 324/338 |
| 2009/0309798 A1 | 12/2009 | Bittar et al. |
| 2010/0004866 A1 | 1/2010 | Rabinovich et al. |
| 2010/0082255 A1 | 4/2010 | Davydycheva et al. |
| 2011/0006773 A1 | 1/2011 | Bittar |
| 2011/0175899 A1 | 7/2011 | Bittar et al. |
| 2011/0180327 A1 | 7/2011 | Bittar et al. |
| 2011/0186290 A1 | 8/2011 | Roddy et al. |
| 2011/0187556 A1 | 8/2011 | Roddy et al. |
| 2011/0192592 A1 | 8/2011 | Roddy et al. |
| 2011/0199228 A1 | 8/2011 | Roddy et al. |
| 2011/0221442 A1* | 9/2011 | Maurer et al. ............. 324/338 |
| 2011/0221443 A1 | 9/2011 | Bittar et al. |
| 2011/0298461 A1 | 12/2011 | Bittar et al. |
| 2011/0308794 A1 | 12/2011 | Bittar et al. |
| 2011/0308859 A1 | 12/2011 | Bittar et al. |
| 2011/0309833 A1 | 12/2011 | Yang |
| 2011/0309836 A1 | 12/2011 | Bittar et al. |
| 2012/0001637 A1 | 1/2012 | Bittar et al. |
| 2012/0024600 A1 | 2/2012 | Bittar et al. |
| 2012/0025834 A1 | 2/2012 | Minerbo et al. |
| 2012/0133367 A1 | 5/2012 | Bittar et al. |
| 2013/0105224 A1 | 5/2013 | Donderici et al. |
| 2014/0191879 A1 | 7/2014 | Bittar et. al. |

FOREIGN PATENT DOCUMENTS

| | | |
|---|---|---|
| EP | 1315984 | 1/2011 |
| EP | 1155343 | 3/2011 |
| GB | 2441033 | 2/2008 |
| WO | WO-2007/149106 | 12/2007 |
| WO | 2008/008346 | 1/2008 |
| WO | WO-2008/008386 | 1/2008 |
| WO | WO-2008/021868 | 2/2008 |
| WO | WO-2008/036077 | 3/2008 |
| WO | WO-2008/076130 | 6/2008 |
| WO | WO-2009/014882 | 1/2009 |
| WO | WO-2009/091408 | 7/2009 |
| WO | WO-2010/005902 | 1/2010 |
| WO | WO-2010/005907 | 1/2010 |
| WO | WO-2010/006302 | 1/2010 |
| WO | WO-2010/065208 | 6/2010 |
| WO | WO-2010/075237 | 7/2010 |
| WO | WO-2011/049828 | 4/2011 |
| WO | WO-2011/129828 | 10/2011 |
| WO | WO-2012/005737 | 1/2012 |
| WO | WO-2012/008965 | 1/2012 |
| WO | WO-2012/064342 | 5/2012 |
| WO | 2013/025222 | 2/2013 |
| WO | 2014/003701 | 1/2014 |
| WO | 2014/003702 | 1/2014 |

OTHER PUBLICATIONS

Halliburton Energy Services, Inc, "Halliburton US Application", dated Feb. 7, 2012, U.S. Appl No. 13/101,889, "Methods and Systems for Determining Formation Parameters Using a Rotating Tool Equipped with Tilted Antenna Loops", filed May 5, 2011, 55 pgs.

PCT Application, dated Jun. 25, 2012, Appl No. PCT/US2012/043943, "Tilted Antenna Logging Systems and Methods Yielding Robust Measurement Signals", filed Jun. 25, 2012, 20 pgs.

PCT International Search Report and Written Opinion, dated Aug. 31, 2012, Appl No. PCT/US2012/043937, "Resistivity Logging Systems and Methods Employing Ratio Signal Set for Inversion", filed Jun. 25, 2012 , 28 pgs.

(56) References Cited

OTHER PUBLICATIONS

PCT International Search Report and Written Opinion, dated Sep. 20, 2012, Appl No. PCT/US2012/043943, "Tilted Antenna Logging Systems and Methods Yielding Robust Measurement Signals" filed Jun. 5, 2012, 12 pgs.

US Patent Application, dated Jun. 25, 2012, Appl No. PCT/US2012/043937, "Resistivity Logging Systems and Methods Employing Ratio Signal Set for Inversion", filed Jun. 25, 2012, 17 pgs.

PCT International Preliminary Report on Patentability, dated Jun. 6, 2014, Appl No. PCT/US2012/043943, "Tilted Antenna Logging Systems and Methods Yielding Robust Measurement Signals," filed Jun. 5, 2012, 6 pgs.

PCT International Preliminary Report on Patentability, dated Jun. 18, 2014, Appl No. PCT/US2012/043937, "Resistivity Logging Systems and Methods Employing Ratio Signal Set for Inversion", filed Jun. 25, 2012, 4 pgs.

US Non-Final Office Action, dated Jul. 31, 2013, U.S. Appl. No. 13/175,514, "Correcting for Magnetic Interference in Azimuthal Tool Measurements", filed Jul. 1, 2011, 15 pgs.

PCT International Preliminary Report on Patentability, dated Sep. 12, 2013, Appl No. PCT/US2011/048317, "Improved Casing Detection Tools and Methods", filed Aug. 18, 2011, 8 pgs.

US Final Office Action, dated Apr. 18, 2014, U.S. Appl. No. 13/116,069, "System and Method for EM Ranging in Oil-Based Mud," filed May 26, 2011, 8 pgs.

US Final Office Action, dated May 8, 2014, U.S. Appl. No. 13/175,514, "Correcting for Magnetic Interference in Azimuthal Tool Measurements", filed Jul. 1, 2011, 15 pgs.

US Non-Final Office Action, dated Oct. 8, 2013, U.S. Appl. No. 13/116,069, "System and Method for EM Ranging in Oil-Based Mud", filed May 26, 2011, 12 pgs.

US Non-Final Office Action, dated Oct. 23, 2013, U.S. Appl. No. 13/116,150, "Real Time Determination of Casing Location and Distance with Tilted Antenna Measurement", filed May 26, 2011, 20 pgs.

* cited by examiner

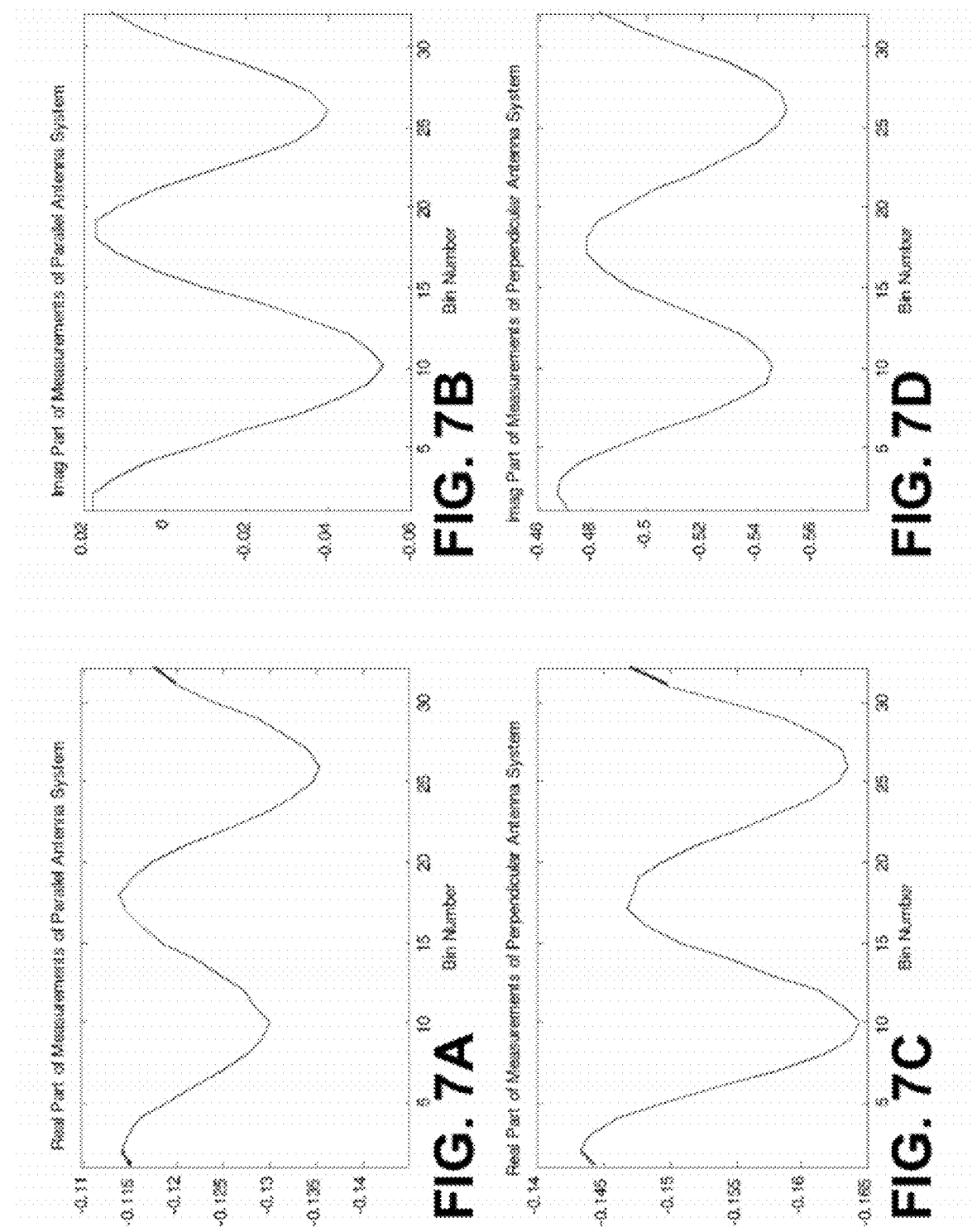

REAL-TIME CASING DETECTION USING TILTED AND CROSSED ANTENNA MEASUREMENT

CROSS-REFERENCE TO RELATED APPLICATIONS

This application is a continuation-in-part of, and claims priority to, U.S. application Ser. No. 13/116,150, titled "Real time determination of casing location and distance with tilted antenna measurement" and filed May 26, 2011 by M. Bittar, S. Li, and H. Wu, which in turn claims priority to Provisional U.S. Application 61/357,324, titled "Real time determination of casing location and distance with titled antenna measurement" and filed Jun. 22, 2010 by M. Bittar, S. Li and H. Wu, both of which are herein incorporated by reference.

BACKGROUND

The world depends on hydrocarbons to solve many of its energy needs. Consequently, oil field operators strive to produce and sell hydrocarbons as efficiently as possible. Much of the easily obtainable oil has already been produced, so new techniques are being developed to extract less accessible hydrocarbons. These techniques often involve drilling a borehole in close proximity to one or more existing wells. One such technique is steam-assisted gravity drainage ("SAGD") as described in U.S. Pat. No. 6,257,334, "Steam-Assisted Gravity Drainage Heavy Oil Recovery Process". SAGD uses a pair of vertically-spaced, horizontal wells less than 10 meters apart, and careful control of the spacing is important to the technique's effectiveness. Other examples of directed drilling near an existing well include intersection for blowout control, multiple wells drilled from an offshore platform, and closely spaced wells for geothermal energy recovery.

One way to direct a borehole in close proximity to an existing well is "active ranging" in which an electromagnetic source is located in the existing well and monitored via sensors on the drillstring. By contrast systems that locate both the source and the sensors on the drillstring are often termed "passive ranging". Passive ranging may be preferred to active ranging because it does not require that operations on the existing well be interrupted. Existing passive ranging techniques rely on magnetic "hot spots" in the casing of the existing well, which limits the use of these techniques to identify areas where there is a significant and abrupt change in the diameter of casing or where the casing has taken on an anomalous magnetic moment, either by pre-polarization of the casing before it is inserted into the wellbore, or as a random event. See, e.g., U.S. Pat. No. 5,541,517 "A method for drilling a borehole from one cased borehole to another cased borehole". In order to carry out such a polarization without interrupting production, it has been regarded as necessary to polarize the casing at some point in the construction of the well. This approach cannot be applied to wells that are already in commercial service without interrupting that service.

BRIEF DESCRIPTION OF THE DRAWINGS

FIGS. 7A-7D are graphs of measured response signals;

Figure 1:
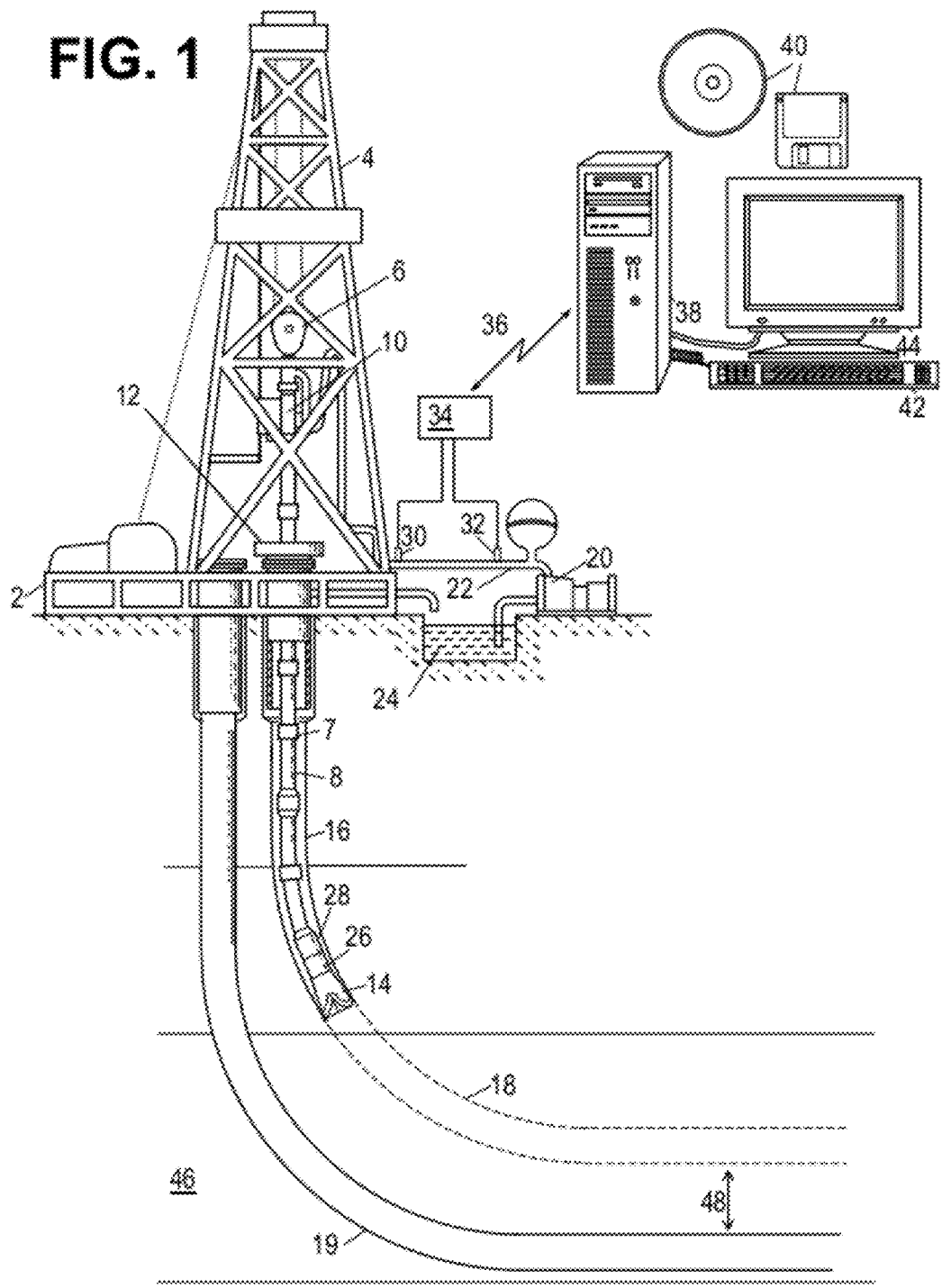
FIG 1 shows an illustrative drilling environment in which electromagnetically-guided drilling may be employed.

While the invention is susceptible to various modifications and alternative forms, specific embodiments thereof are shown by way of example in the drawings and will herein be described in detail. It should be understood, however, that the drawings and detailed description are not intended to limit the disclosure to these particular embodiments, but on the contrary, the intention is to cover all modifications, equivalents and alternatives falling within the scope of the appended claims.

DETAILED DESCRIPTION

The issues identified in the background are at least partly addressed by disclosed methods and apparatus for detecting nearby conductors such as pipes, well casing, etc., from within a borehole. In at least some method embodiments, a conductive feature can be detected by transmitting an electromagnetic signal from a first antenna on a downhole logging tool and measuring a response signal with a second antenna on the downhole logging tool. As the tool rotates, the transmitting and measuring are repeated to determine the azimuthal dependence of the response signal. The azimuthal dependence is analyzed to determine a diagonal component and optionally a cross component. The amplitude of the diagonal component is indicative of distance to the conductive feature. Direction can be determined based on the diagonal component alone or, to eliminate any ambiguity, based on the diagonal component in combination with the cross component. Sinusoidal curve fitting can be employed to improve accuracy of the distance and direction estimates. At least one of the antennas is preferably tilted. Measurement results are presented for parallel tilted and perpendicular tilted antennas.

In other method embodiments, a conductive feature can be detected by transmitting an electromagnetic signal from a first antenna on a downhole logging tool and measuring response signals with two collocated receive antennas on the downhole logging tool. As the tool rotates, the transmitting and measuring are repeated to determine the azimuthal dependence of the response signals. The azimuthal dependence is analyzed to determine a diagonal component of a parallel receive signal and a diagonal component of a perpendicular receive signal. The components are combined to form a ratio that is proportional to the distance between the logging tool and a casing string of another well. The equation of a curve fitted to the ratio is used to estimate the tool-to-casing distance based upon the measured response signals. The casing direction may be determined based on the perpendicular signal's cross component alone, or in combination with the perpendicular and parallel signal's diagonal components.

The disclosed systems and methods are best understood in a suitable usage context. Accordingly, FIG 1 shows an illustrative geosteering environment. A drilling platform 2 supports a derrick 4 having a traveling block 6 for raising and lowering a drill string 8. A top drive 10 supports and rotates the drill string 8 as it is lowered through the wellhead 12. A drill bit 14 is driven by a downhole motor and/or rotation of the drill string 8. As bit 14 rotates, it creates a borehole 16 that passes through various formations. A pump 20 circulates drilling fluid through a feed pipe 22 to top drive 10, downhole through the interior of drill string 8, through orifices in drill bit 14, back to the surface via the annulus around drill string 8, and into a retention pit 24. The drilling fluid transports cuttings from the borehole into the pit 24 and aids in maintaining the borehole integrity.

The drill bit 14 is just one piece of a bottom-hole assembly that includes one or more drill collars (thick-walled steel pipe) to provide weight and rigidity to aid the drilling process. Some of these drill collars include logging instruments to gather measurements of various drilling parameters such as position, orientation, weight-on-bit, borehole diameter, etc. The tool orientation may be specified in terms of a tool face angle (a.k.a. rotational or azimuthal orientation), an inclination angle (the slope), and a compass direction, each of which can be derived from measurements by magnetometers, inclinometers, and/or accelerometers, though other sensor types such as gyroscopes may alternatively be used. In one specific embodiment, the tool includes a 3-axis fluxgate magnetometer and a 3-axis accelerometer. As is known in the art, the combination of those two sensor systems enables the measurement of the tool face angle, inclination angle, and compass direction. In some embodiments, the tool face and hole inclination angles are calculated from the accelerometer sensor output. The magnetometer sensor outputs are used to calculate the compass direction.

The bottom-hole assembly further includes a ranging tool 26 to induce a current in nearby conductors such as pipes, casing strings, and conductive formations and to collect measurements of the resulting field to determine distance and direction. Using these measurements in combination with the tool orientation measurements, the driller can, for example, steer the drill bit 14 along a desired path 18 relative to the existing well 19 in formation 46 using any one of various suitable directional drilling systems, including steering vanes, a "bent sub", and a rotary steerable system. For precision steering, the steering vanes may be the most desirable steering mechanism. The steering mechanism can be alternatively controlled downhole, with a downhole controller programmed to follow the existing borehole 19 at a predetermined distance 48 and position (e.g., directly above or below the existing borehole).

A telemetry sub 28 coupled to the downhole tools (including ranging tool 26) can transmit telemetry data to the surface via mud pulse telemetry. A transmitter in the telemetry sub 28 modulates a resistance to drilling fluid flow to generate pressure pulses that propagate along the fluid stream at the speed of sound to the surface. One or more pressure transducers 30, 32 convert the pressure signal into electrical signal(s) for a signal digitizer 34. Note that other forms of telemetry exist and may be used to communicate signals from downhole to the digitizer. Such telemetry may employ acoustic telemetry, electromagnetic telemetry, or telemetry via wired drillpipe.

The digitizer 34 supplies a digital form of the telemetry signals via a communications link 36 to a computer 38 or some other form of a data processing device. Computer 38 operates in accordance with software (which may be stored on information storage media 40) and user input via an input device 42 to process and decode the received signals. The resulting telemetry data may be further analyzed and processed by computer 38 to generate a display of useful information on a computer monitor 44 or some other form of a display device. For example, a driller could employ this system to obtain and monitor drilling parameters, formation properties, and the path of the borehole relative to the existing borehole 19 and any detected formation boundaries. A downlink channel can then be used to transmit steering commands from the surface to the bottom-hole assembly.

Figure 2A:
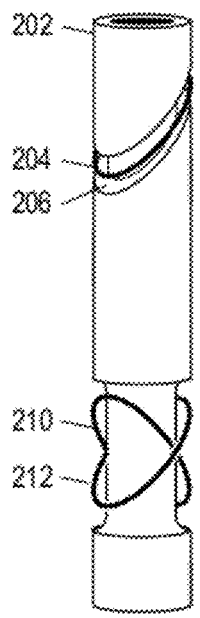
FIGS. 2A and 2B show an illustrative ranging tool embodiment and the relative positions and angles of the antennas.

FIG 2A shows an illustrative ranging tool 202 in more detail. It includes a transmit antenna coil 204 set in a recess 206 around the circumference of the tool. The illustrated transmit antenna 204 is positioned at a 45° tilt angle to provide an azimuthal asymmetry to the transmitted electromagnetic signal. The tool further includes two tilted receive antenna coils 210, 212 in a second recess around the tool circumference. Antenna 212 is parallel to the transmit antenna 204, while antenna 210 is perpendicular to the transmit antenna. Antennas 210 and 212 are shown as being collocated, but this is not a requirement for at least some embodiments. The disclosed methods can be employed with a single transmit-receive antenna pair, which can be collocated if desired, but it is expected that the use of additional transmit-receive antenna pairings will provide better ranging performance. As will become clear, the relative spacings and relative tilt angles can be varied as desired, so long as at least one of the transmit or receive antennas provides azimuthal sensitivity. A nonconductive filler material may be used to fill the recesses to seal and protect the antenna coils.

Figure 3A:
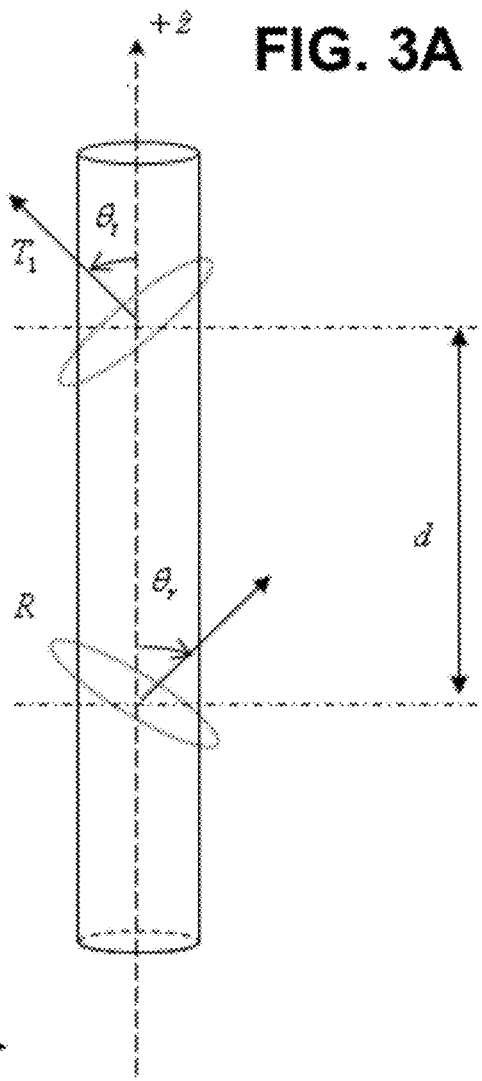
FIGS. 3A-3B illustrates the variables used in analyzing the operation of the tool.
Figure 3B:
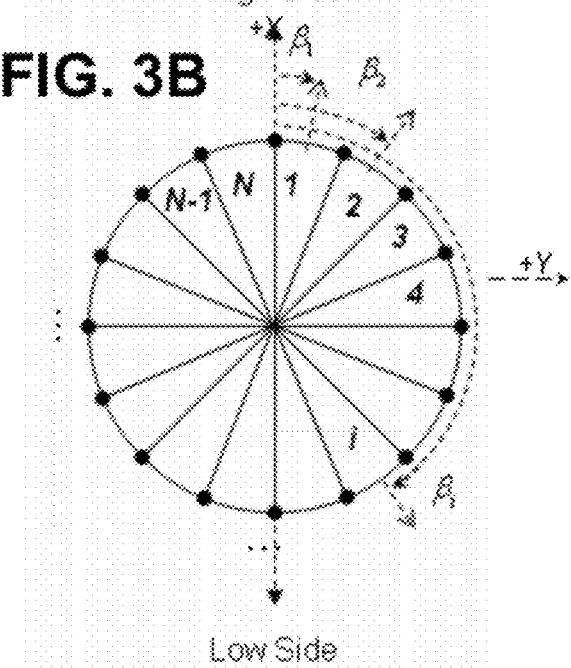

FIG 3A shows an illustrative tool model having a longitudinal axis coincident with a coordinate z-axis. A transmit antenna coil T1 is provided with a tilt angle θ, relative to the z-axis and a receive antenna coil R is provided with a tilt angle $θ_r$ relative to the z-axis, usually with its normal vector in the same plane defined by the z-axis and the normal vector of the transmit antenna coil. The transmit and receive antenna coils are centered on the z-axis with their center points separated by a distance d. The x- and y-axes are as shown in FIG 3B. The x-axis is directed from the z-axis toward the high side of the borehole. (For vertical boreholes, the north side of the borehole is often taken as the "high" side.) The y-axis is drawn perpendicular to the x- and z-axes using the right hand rule. The azimuthal angle β is measured from the x-axis starting in the direction of the y-axis. The measurements taken around the circumference of the borehole are often grouped into azimuthal bins. As illustrated in FIG 3B, each bin i can be associated with a representative azimuthal angle $β_i$. Of course the measurements can be grouped into bins along the z-axis as well.

The following equations use the notation $V_R^T$ to represent the signal measured by a receive antenna coil R in response to the operation of a transmit antenna coil T. Where T is x, y, or z, $V_R^T$ assumes a hypothetical transmit antenna coil oriented along the x-, y-, or z-axis, respectively. The same is true where R is x, y, or z. Where the normal vectors of the transmit and receive antenna coils are in the same plane, the receive signal as a function of azimuthal angle β is:

$$V_R^T(β) = \begin{bmatrix} \sin θ_t \cos β \\ \sin θ_t \sin β \\ \cos θ_t \end{bmatrix}^T \begin{bmatrix} V_x^x & V_y^x & V_z^x \\ V_x^y & V_y^y & V_z^y \\ V_x^z & V_y^z & V_z^z \end{bmatrix} \begin{bmatrix} \sin θ_r \cos β \\ \sin θ_r \sin β \\ \cos θ_r \end{bmatrix}, \quad (1)$$

where the matrix elements $V_I^J$ are complex values representing the signal amplitude and phase shift measured by a hypothetical receiver having an I-axis dipole component in response to the firing of a hypothetical transmitter having a J-axis dipole component.

Equation (1) can be also written out to highlight the azimuthal angle dependence:

$$V_R^T(\beta) = a_{xx}\cos^2\beta + (a_{xy}+a_{yx})\cos\beta\sin\beta + (a_{xz}+a_{zx})\cos\beta + a_{yy}\sin^2\beta + (a_{yz}+a_{zy})\sin\beta + a_{zz}, \quad (2)$$

where $a_{xx} = V_x^x \sin\theta_t \sin\theta_r$; $a_{xy} = V_y^x \sin\theta_t \sin\theta_r$; $a_{xz} = V_z^x \sin\theta_t \cos\theta_r$ $a_{yx} = V_x^y \sin\theta_t \sin\theta_r$; $a_{yy} = V_y^y \sin\theta_t \sin\theta_r$; $a_{yz} = V_z^y \sin\theta_t \cos\theta_r$ $a_{zx} = V_x^z \cos\theta_t \sin\theta_r$; $a_{zy} = V_y^z \cos\theta_t \sin\theta_r$; $a_{zz} = V_z^z \cos\theta_t \cos\theta_r$ Note that the $a_{IJ}$ coefficients are determined by the antenna system design and environmental effects, and they do not vary with azimuthal angle. Further manipulation yields:

$$V_R^T(\beta) = \left(\frac{a_{xx}}{2} - \frac{a_{yy}}{2}\right)\cos 2\beta + \left(\frac{a_{xy}}{2} + \frac{a_{yx}}{2}\right)\sin 2\beta + \\ (a_{xz}+a_{zx})\cos\beta + (a_{yz}+a_{zy})\sin\beta + \left(a_{zz} + \frac{a_{xx}}{2} + \frac{a_{yy}}{2}\right) \quad (3)$$

Typical logging applications employ the azimuthal angle binning described previously, which would cause each occurrence of the azimuthal angle $\beta$ in equation (3) to be replaced with the representative azimuthal bin angle $\beta_i$.

Figure 4:
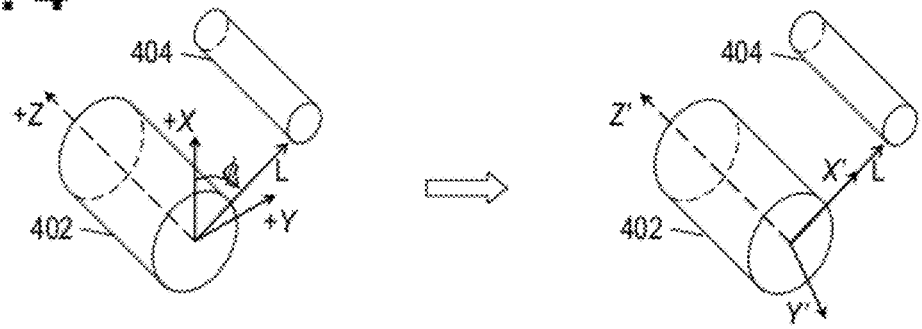
FIG 4 shows a coordinate system for specifying a direction and distance to a nearby casing.

The left side of FIG 4 shows a default x-y-z coordinate system for tool 402, with an existing well casing 404 lying parallel to the z-axis at a distance L and an azimuthal angle $\phi$. Equation (3) assumes an arbitrary coordinate system and consequently would apply. However, if the default coordinate system is rotated as shown in the right side of FIG 4, i.e., so that the azimuthal angle to the casing $\phi$=0, the $a_{xy}$, $a_{yx}$, $a_{yz}$, and $a_{zy}$ in the rotated coordinate system would be expected to disappear. Consequently the measured voltages would be expected to have a simplified representation:

$$V_R^T(\beta_i') = \left(\frac{a_{xx}'}{2} - \frac{a_{yy}'}{2}\right)\cos 2\beta_i' + (a_{xz}' + a_{zx}')\cos\beta_i' + \left(a_{zz}' + \frac{a_{xx}'}{2} + \frac{a_{yy}'}{2}\right) \quad (4)$$

where a'$_{IJ}$ is a tool coefficient and $\beta'$ is a tool azimuthal angle in the rotated coordinate system.

To achieve the simplification given in equation (4), a curve fitting operation may be employed to determine an appropriate coordinate rotating angle $\phi_r$, which also corresponds to the azimuthal angle for the direction vector to the casing. This observation motivates the ranging methods represented by the flowchart in FIG 5.

Beginning in block 502, the tool begins its measurement cycle by selecting a first transmit antenna. In block 504, the tool transmits an electromagnetic signal with the selected transmit antenna and measures the response of each receive antenna. The tool also determines its position and orientation at the time of transmission. In block 506, the tool updates the measurement averages for the bin corresponding to that tool position and orientation. In block 508, the tool determines whether a measurement cycle has been completed (i.e., whether each of the transmit antennas has been used), and if not, blocks 504-508 are repeated until the measurement cycle is finished.

In block 510, the azimuthal dependence of the measurements is analyzed to find three components: the diagonal component $V_{diag}$, the cross-component $V_{cc}$, and the constant component $V_{const}$. These components are defined as:

$$V_{diag}(i) \equiv \frac{V_R^T(\beta_i) + V_R^T(\beta_{i\pm\frac{N}{2}})}{2} \quad (5)$$

$$V_{cc}(i) \equiv \frac{V_R^T(\beta_i) - V_R^T(\beta_{i\pm\frac{N}{2}})}{2} \quad (6)$$

$$V_{const} \equiv \frac{\sum_{i=1}^{N} V_R^T(\beta_i)}{N} \quad (7)$$

where N is the number of azimuthal bins (FIG 3B) and bin i±N/2 is the bin opposite from bin i. Equation (7) corresponds to the third term in equation (4), equation (6) corresponds to the second term in equation (4), and equation (5) corresponds to the sum of the first and third terms in equation (4). Equations (5)-(7) do not account for the rotation angle $\phi$, but the system determines that angle in block 512 by, e.g., fitting sinusoidal curves to the diagonal component and cross-component. The curve fits can be performed to each component separately or, if desired, to the measurements directly. The curve fit yields complex coefficients A, B, C, and $\phi$:

$$V_R^T(\beta) = A\cos^2(\beta-\phi) + B\cos(\beta-\phi) + C \quad (8)$$

A least mean square curve fitting method was employed, but other fitting techniques may also be suitable.

In a homogeneous medium, the above three components are only sensitive to a nearby casing, especially the diagonal component $V_{diag}$. The diagonal component is expected to demonstrate better sensitivity to a nearby casing and better noise resistance, but due to its double period ($\cos 2(\beta-\phi)$) will also have a 180° ambiguity for measuring the casing's azimuthal angle $\phi$. Since the cross-component $V_{cc}$ only has a single period ($\cos(\beta-\phi)$), it can be used to resolve this ambiguity for a unique determination of the azimuthal angle $\phi$. The distance can then be estimated based on the amplitudes of the components. An example of this direction and determination process is described further below.

Once the system has determined a measurement of casing direction and distance in block 512, the new measurement can be used in block 514 to update a display for the driller and/or to automatically adjust the steering direction for the drilling assembly. In block 516, the tool determines whether operations are complete, and if not, repeats the process.

Figure 6:
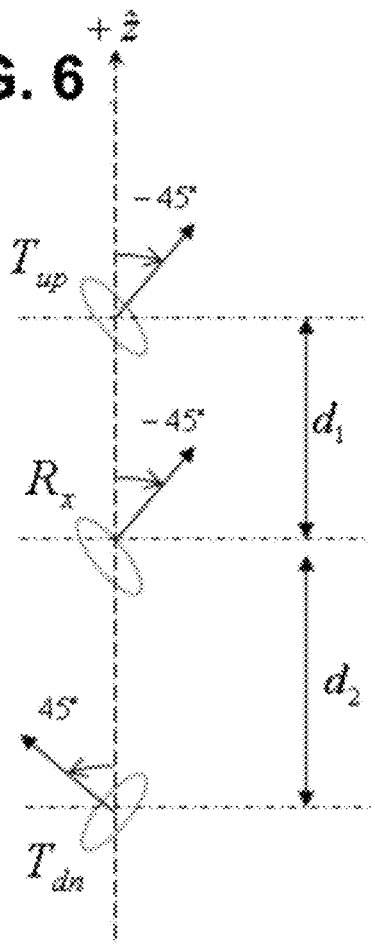
FIG 6 shows an alternative ranging tool embodiment.

FIG 6 shows a ranging tool embodiment that was tested in a water tank having water with a resistivity of 1 Ω·m. The tested tool included two transmit-receive antenna pairs, the first pair being parallel ($T_{up}$-$R_x$ in FIG 6) with both tilted at an angle of −45° and the second pair being perpendicular ($T_{dn}$-$R_X$ in FIG 6) with the transmit antenna coil tilted at an angle of 45° and the receive antenna coil tilted at an angle of −45°. The spacing between the first transmit-receive antenna pair is $d_1$ and the spacing between the second transmit-receive antenna pair is $d_2$. Measurements were made with $d_1=d_2=48$" and a signal frequency of 125 kHz. The casing was placed parallel to the tool as shown in FIG 4.

The measured response signals are graphed in FIGS. 7A-7D. FIGS. 7A and 7B show the real and imaginary parts of the response signal for the parallel transmit-receive antenna pair, while FIGS. 7C and 7D show the real and imaginary parts of the response signal for the perpendicular transmit-receive antenna pair. In each of the four figures, a strong azimuthal dependence is evident.

Figure 8A:
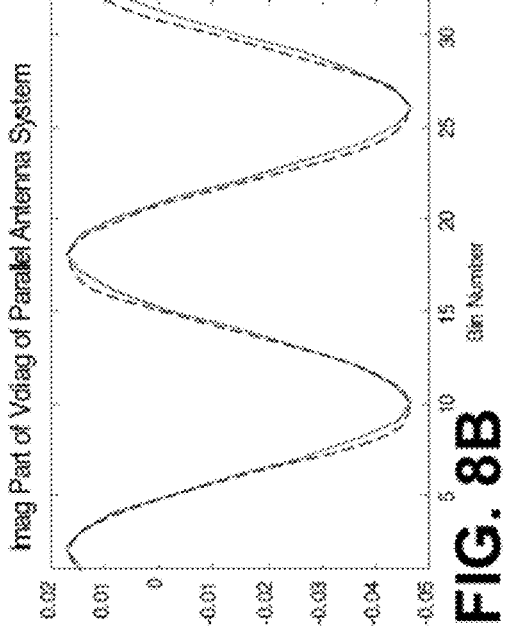
FIGS. 8A-8D are graphs of a measured diagonal component.
Figure 8B:
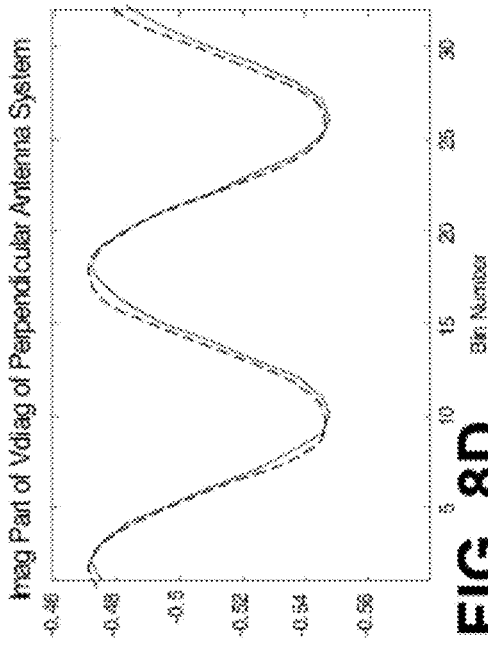
Figure 8C:
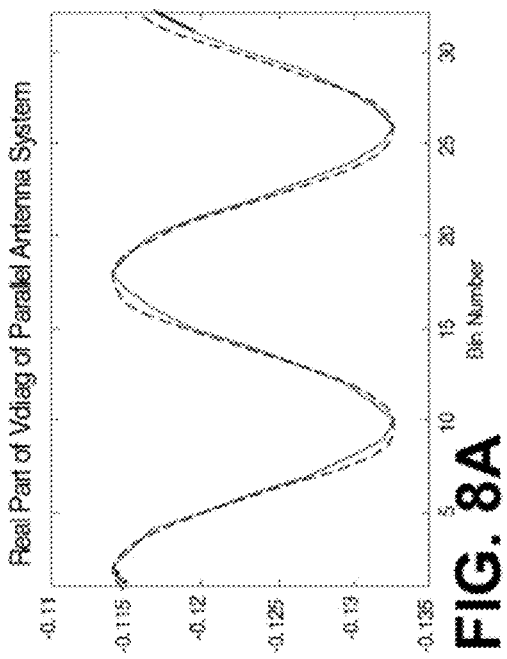
Figure 8D:
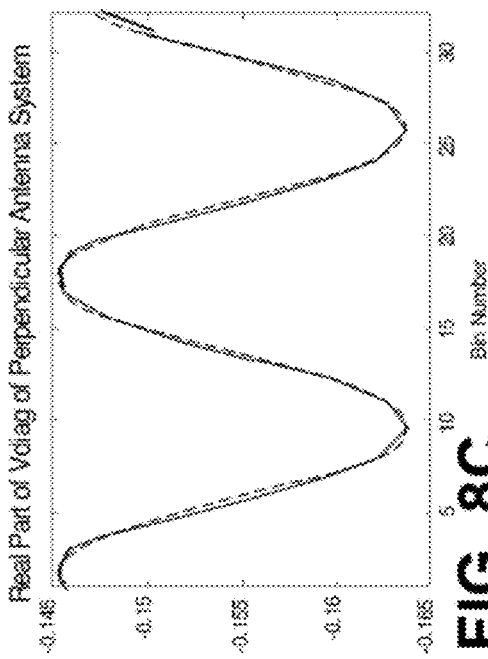
Figure 9B:
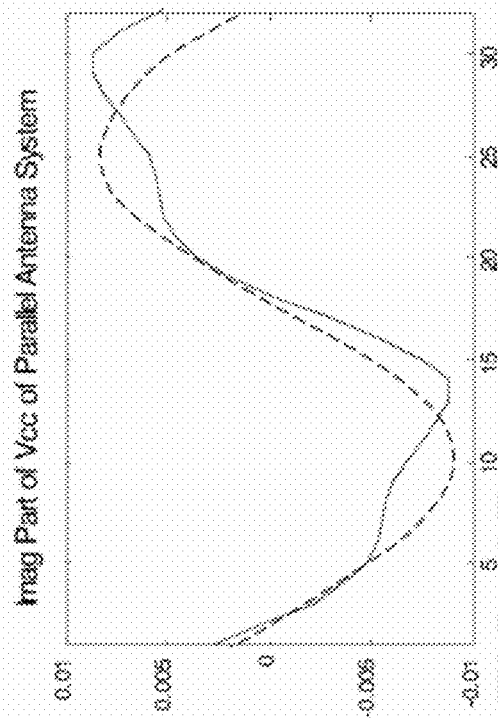
FIGS. 9A-9D are graphs of a measured cross component
Figure 9D:
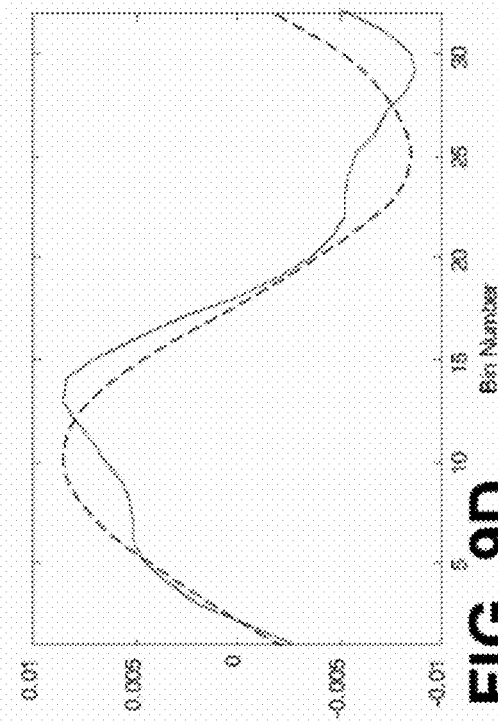
Figure 9A:
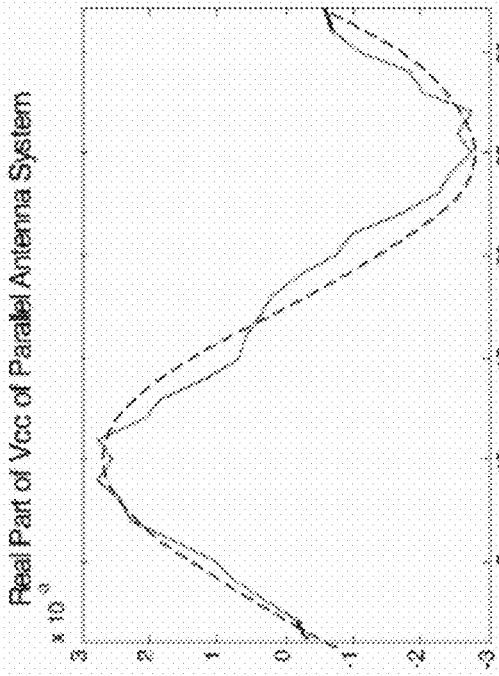
Figure 9C:
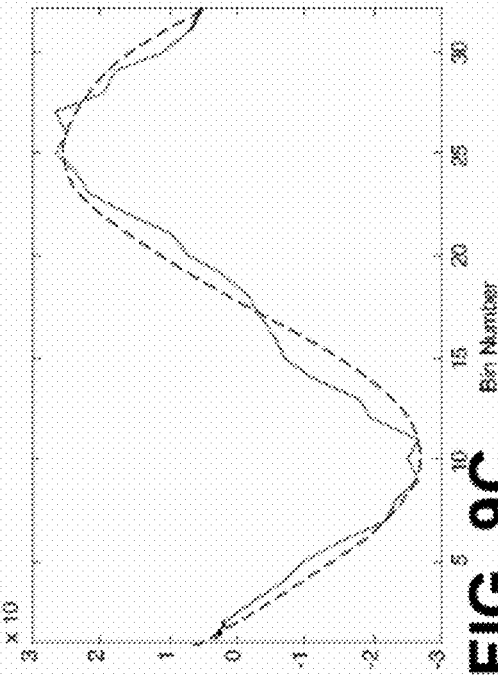

The diagonal component $V_{diag}$ is computed for these measurements and is shown in FIGS. 8A-8D. As before, FIGS. 8A and 8B show the real and imaginary parts of the response signal for the parallel pair, while FIGS. 8C and 8D show the real and imaginary parts of the response signal for the perpendicular pair. Also shown as dashed lines are the sinusoidal curves that have been fit to the diagonal components, from which parameters φ (with some ambiguity), A, and C can be determined.

Similarly, the cross component $V_{cc}$ is computed for these measurements and is shown in FIGS. 9A-9D. Real and imaginary parts for parallel and perpendicular antenna pairs are shown as before. The dashed lines represent the sinusoidal curves that best fit these components, thereby providing parameter B and resolving the ambiguity of φ. From the diagonal component, the plane for the rotated x-axis can be determined. With an arbitrary choice for the x-axis direction in this plane, the cross component can be used to determine whether or not the x-axis direction should be reversed. One way in which the ambiguity can be resolved is by comparing the imaginary and real parts of B as determined by the parallel transmit-receive antenna pair. Specifically, if the imaginary part of B is greater than the real part, the x-axis direction should be reversed.

Figure 10A:
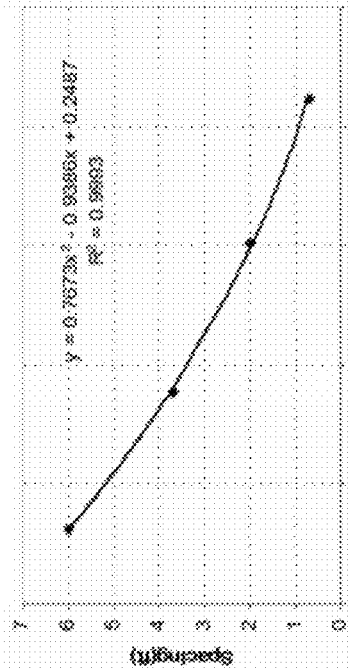
FIGS. 10A-10B are graphs of a first modeled distance dependence.
Figure 10B:
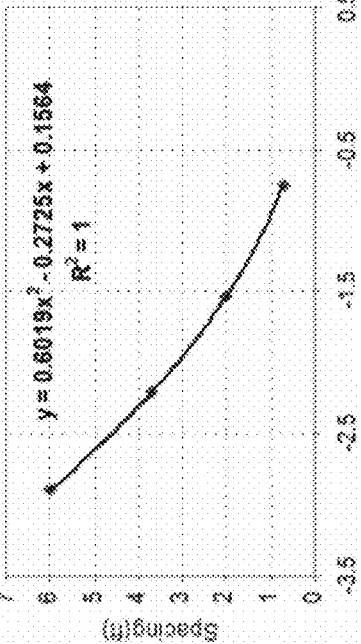
Figure 11A:
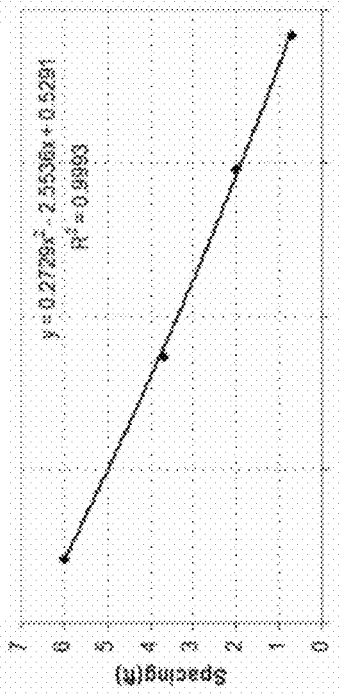
FIGS. 11A-11B are graphs of a second modeled distance dependence.
Figure 11B:
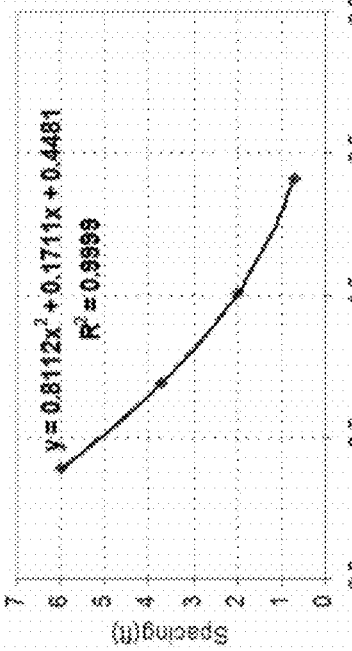

Note that the magnitude of the cross-component signal is substantially smaller than the diagonal component. For this reason, the diagonal component is preferred as the basis for estimating a casing distance. Specifically, the parameter A or the ratio of A/C may be used. FIGS. 10A-10B are graphs of the logarithm of A/C versus casing distance for the parallel and perpendicular transmit-receive antenna pairs, respectively. FIGS. 11A-11B are graphs of the logarithm of A versus casing distance for the parallel and perpendicular transmit receive antenna pairs, respectively. A clear dependence is evident, enabling a straightforward estimation of casing distance from the tool measurements.

Figure 2B:
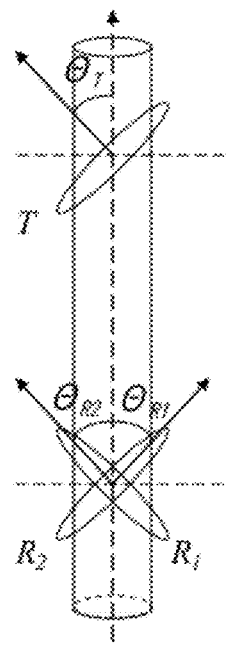

In the above-described embodiments, the diagonal and cross components of a single transmit-receive antenna pair each provide an alternative basis for independently estimating the casing distance. In other illustrative embodiments, transmit and receive antennas are configured such that diagonal and cross components for both parallel and perpendicular receive antenna signal voltage measurements can be combined to estimate the casing distance. The perpendicular signal's diagonal and cross components may also be combined to determine the tool-to-casing angle without ambiguity. FIG 2A shows such an illustrative embodiment, which uses a single tilted transmit antenna 204 parallel to a tilted receive antenna 210 and perpendicular to a tilted receive antenna 212. FIG 2B shows the relative positions and angles of each antenna of FIG 2A. Although a single transmit antenna and two collocated receive antennas is preferred, other embodiments may include two collocated transmit antennas and a single receive antenna.

Transmit antenna T of FIG 2B is tilted relative to the z-axis (also the tool axis) by an angle $\theta_T$, while receive antennas R1 and R2 are respectively tilted with angles $\theta_{R1}$ and $\theta_{R2}$, wherein $\theta_{R1}=-\theta_{R2}$. Transmit antenna T is positioned parallel to receive antenna R2 ($\theta_T=\theta_{R2}$) and perpendicular to antenna R1 ($\theta_T\pm90°=\theta_{R1}$), and the measured signal voltages for each receive antenna are designated $V_{pp}$ (perpendicular) and $V_{pr}$ (parallel). For a tool with the x-axis oriented at an arbitrary angle φ to the casing wherein measurements are taken at N discrete azimuthal angles $\beta_i$, i=1, ..., N, $V_{pp}$ and $V_{pr}$ can each be expressed as a summation of a double period sinusoid as a function of azimuthal angle $\beta_i$, a single period sinusoid as a function of and a constant. Specifically, $$V_{pp}(\beta_i)=A^{pp}\cos(2\beta_i+2\phi)+B^{pp}\sin(\beta_i+\phi)+C^{pp}, \quad (9)$$

$$V_{pr}(\beta_i)=A^{pr}\cos(2\beta_i+2\phi)+B^{pr}\sin(\beta_i+\phi)+C^{pr}, \quad (10)$$

where $A^{pp}$, $A^{pr}$, $B^{pp}$, $B^{pr}$, $C^{pp}$ and $C^{pr}$ are complex coefficients.

Figure 5:
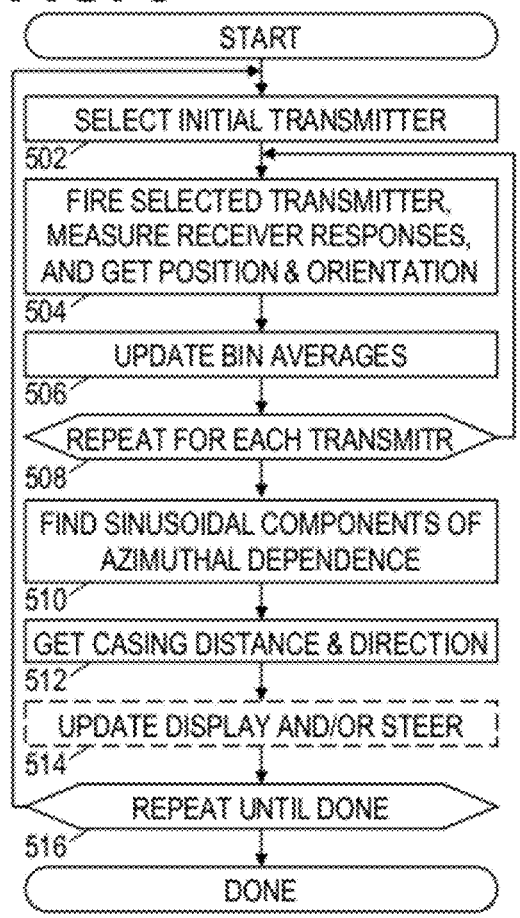
FIG 5 is a flow diagram of an illustrative ranging method.

Applying the ranging method of FIG 5, the azimuthal dependence of the measurements is analyzed to find six components: a perpendicular signal's diagonal component $V_{diag}{}^{pp}$, a perpendicular signal's cross component $V_{cc}{}^{pp}$, a perpendicular signal's constant component $V_{const}{}^{pp}$, a parallel signal's diagonal component $V_{diag}{}^{pr}$, a parallel signal's cross component $V_{cc}{}^{pr}$ and a parallel signal's constant component $V_{const}{}^{pr}$. These components are defined as:

$$V_{diag\_pp}(i) = \frac{V_{pp}(\beta_i)+V_{pp}\left(\beta_{i\pm\frac{N}{2}}\right)}{2} = A^{pp}\cos(2\beta_i+2\phi)+C^{pp}, \quad (11)$$

$$V_{cc\_pp}(i) = \frac{V_{pp}(\beta_i)-V_{pp}\left(\beta_{i\pm\frac{N}{2}}\right)}{2} = B^{pp}\sin(\beta_i+\phi), \quad (12)$$

$$V_{const\_pp} = \frac{\sum_{i=1}^{N}V_{pp}(\beta_i)}{N}, \quad (13)$$

$$V_{diag\_pr}(i) = \frac{V_{pr}(\beta_i)+V_{pr}\left(\beta_{i\pm\frac{N}{2}}\right)}{2} = A^{pr}\cos(2\beta_i+2\phi)+C^{pr}, \quad (14)$$

$$V_{cc\_pr}(i) = \frac{V_{pr}(\beta_i)+V_{pr}\left(\beta_{i\pm\frac{N}{2}}\right)}{2} = B^{pr}\sin(\beta_i+\phi), \quad (15)$$

$$V_{const\_pr} = \frac{\sum_{i=1}^{N}V_{pr}(\beta_i)}{N}, \quad (16)$$

where N is the number of azimuthal bins (FIG 3B) and bin i±N/2 is the bin opposite from bin i.

Fitting the sinusoidal curves of equations (11) and (14) to their corresponding perpendicular and parallel signal's diagonal components yields, $$A^{pp} = \frac{V_x^x-V_y^y}{4}, \quad (17)$$

$$A^{pr} = -\frac{V_x^x-V_y^y}{4}, \quad (18)$$

$$C^{pp} = \frac{2V_z^z+V_x^x+V_y^y}{4}, \quad (19)$$

$$C^{pr} = \frac{2V_z^z-V_x^x-V_y^y}{4}, \quad (20)$$

and also yields tool-to-casing angle φ. Because of the double sinusoid used in the curve fit, however, this angle may be either φ or φ+180°. The phase and attenuation of the perpendicular signal's cross component, which includes complex coefficients, is used to resolve this ambiguity, using the definitions, $$\text{Phase}_i^{pp} = \text{Phase}\left(\frac{B^{pp}\sin(\beta_i + \phi)}{C^{pp}}\right), \quad (21)$$

$$\text{Att}_i^{pp} = \text{Att}\left(\frac{B^{pp}\sin(\beta_i + \phi)}{C^{pp}}\right). \quad (22)$$

Figure 12A:
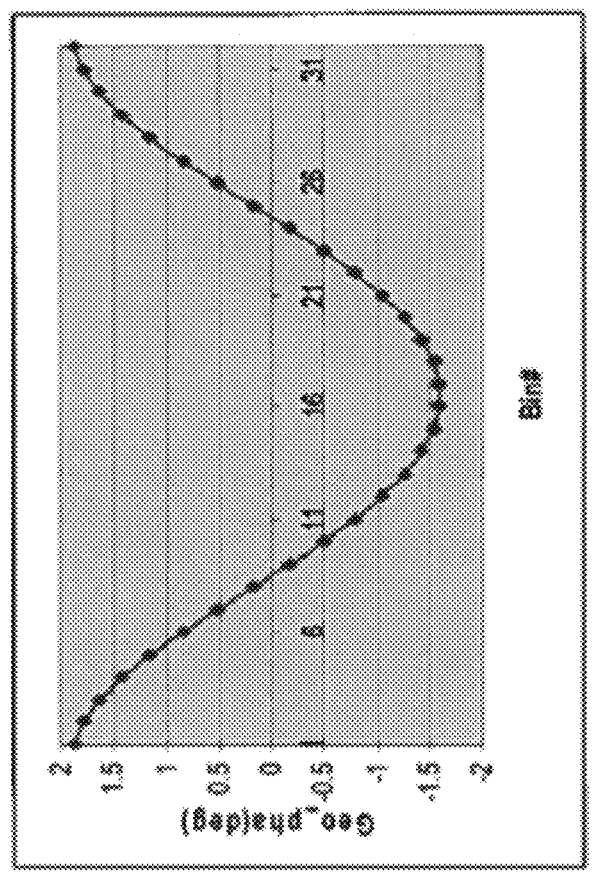
FIGS. 12A-12B are attenuation and phase graphs indicative of a casing direction.
Figure 12B:
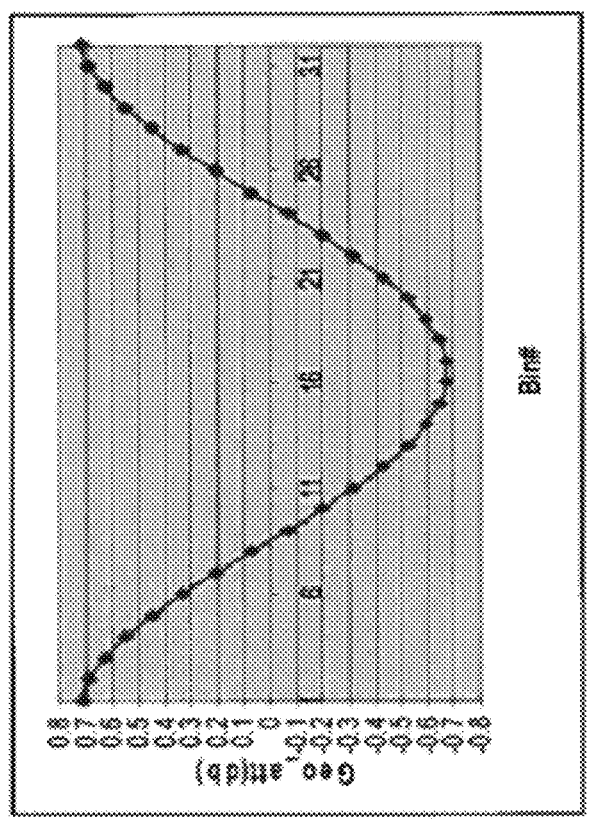

FIGS. 12A and 12B respectively graph the phase (Phase) and attenuation (Att) of equations (21) and (22), wherein the distance between the transmit and receive antennas is 48 inches, the working signal frequency is 500 kHz and the casing is in a direction corresponding to bin position 1. Both the Phase and Att values of equations (21) and (22) are greatest in the direction of the casing. Thus, the casing will be located in the direction $\phi$ if the Phase value for the bin corresponding to $\phi$ is greater than the Phase value for the for the bin corresponding to $\phi+180°$. If the Phase value corresponding to $\phi+180°$ is greater than the Phase value corresponding to $\phi$, the casing is located in the direction of $\phi+180°$. Similarly, the casing will be located in the direction $\phi$ if the Att value for the bin corresponding to $\phi$ is greater than the Att value for the for the bin corresponding to $\phi+180°$. If the Att value corresponding to $\phi+180°$ is greater than the Att value corresponding to $\phi$, the casing is located in the direction of $\phi+180°$.

The tool-to-casing distance may be determined using ratios combining the coefficients from equations (17) through (20). Noting that, $$C^{pp} - C^{pr} = \frac{V_x^x + V_y^y}{2}, \quad (23)$$

$$A^{pr} - A^{pp} = \frac{V_x^x - V_y^y}{2}, \quad (24)$$

and that the $V_x^x$ and $V_y^y$ voltage components are the same for both receive antennas due to their colocation and positioning, we have, $$\text{Ratio 1} = \frac{A^{pr} - A^{pp}}{C^{pp} - C^{pr}} = \frac{V_x^x - V_y^y}{V_x^x + V_y^y}. \quad (25)$$

This same end result may also be derived from a system using separate transmitter and receiver pairs using either of the two ratios, $$\text{Ratio 2} = \frac{2A^{pp}}{C^{pp} - C^{pr}} = \frac{V_x^x - V_y^y}{V_x^x + V_y^y}, \quad (26)$$

$$\text{Ratio 3} = \frac{-2A^{pr}}{C^{pp} - C^{pr}} = \frac{V_x^x - V_y^y}{V_x^x + V_y^y}. \quad (27)$$

Figure 13A:
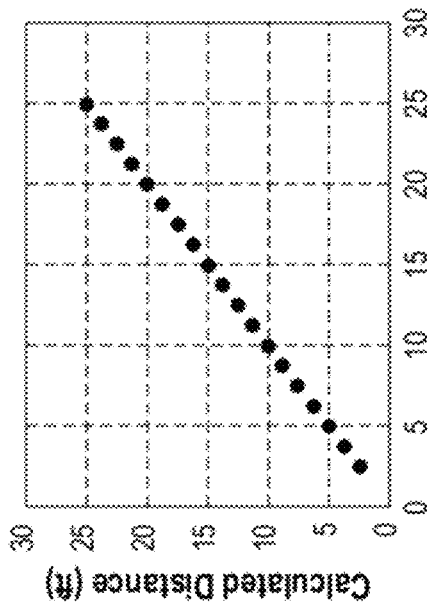
FIGS. 13A-13B are graphs of a measured signal ratio magnitude and estimated versus actual distances.
Figure 13B:
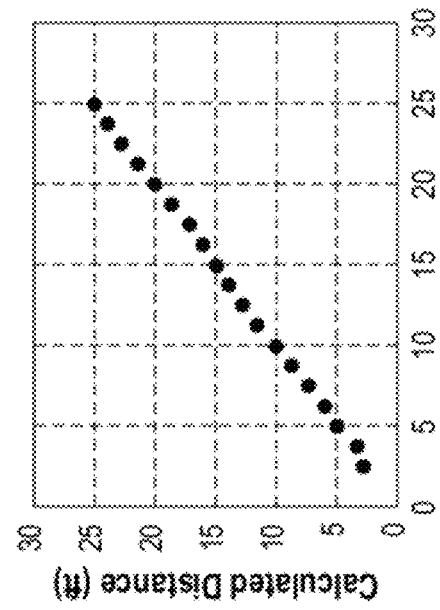
Figure 14A:
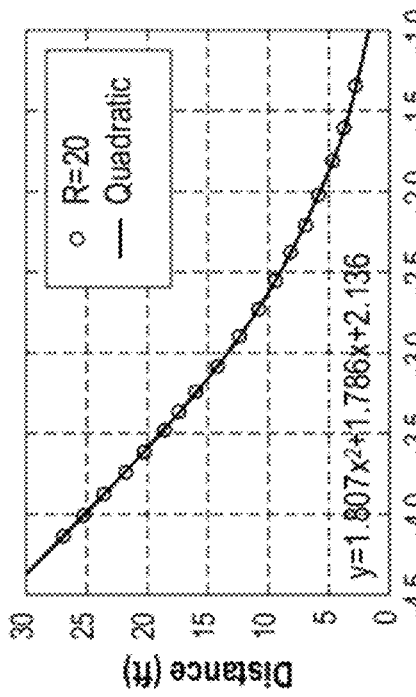
FIGS. 14A-14B are graphs of a measured signal ratio phase and estimated versus actual distances.
Figure 14B:
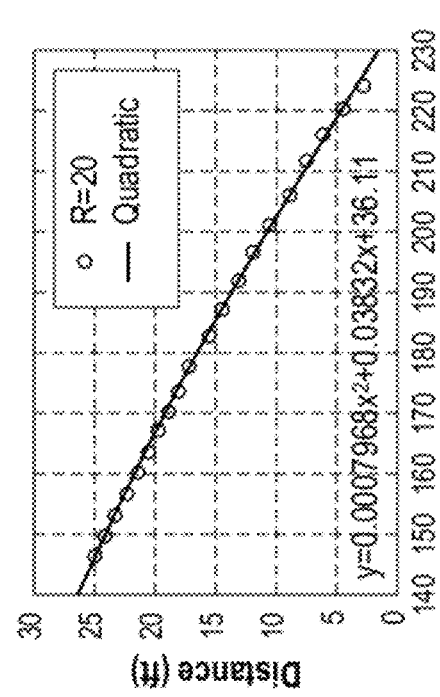

FIG 13A shows the relationship between the attenuation of Ratio1 and the tool-to-casing distance within a simulated formation having a resistivity of 20 ohm-m, with distances ranging between 3 and 25 feet. A quadratic curve fit is performed on the simulated data, and the predicted distances from the resulting quadratic equation are plotted against the actual simulated distances in FIG 13B. As can be seen from the high correlation between Ratio1 and the tool-to-casing distance in FIGS. 13A and 13B, the curve fitted quadratic equation accurately estimates the tool-to-casing distance (for a known formation resistivity) based on the received voltage signals measured by an illustrative tool such as the tool of FIG 2A. FIG 14A shows a plot and curve fit similar to 13A, but instead illustrates the relationship between the phase of Ratio1 and the tool-to-casing distance. This relationship is also highly correlated to the tool-to-casing distance, and as can be seen from FIG 14B also results in a curve fitted quadratic equation that accurately estimate the tool-to-casing distance.

It is expected that the system range and performance can be extended with the use of multiple receive antenna stations and/or multiple transmit antenna stations. In many situations, it may not be necessary to perform explicit distance and direction calculations. For example, the signal components may be extracted and converted to pixel colors or intensities and displayed as a function of tool position and azimuth. Assuming the casing string is within detection range, it will appear as a bright (or, if preferred, a dark) band in the image. The color or brightness of the band indicates the distance to the casing string, and the position of the band indicates the direction to the casing string. Thus, by viewing such an image, a driller can determine in a very intuitive manner whether the new borehole is drifting from the desired course and he or she can quickly initiate corrective action. For example, if the band becomes dimmer, the driller can steer towards the casing string. Conversely, if the band increases in brightness, the driller can steer away from the casing string. If the band deviates from its desired position directly above or below the casing string, the driller can steer laterally to re-establish the desired directional relationship between the boreholes.

Numerous other variations and modifications will become apparent to those skilled in the art once the above disclosure is fully appreciated. For example, the foregoing discussion has focused on a logging while drilling implementation, but the disclosed techniques would also be suitable for wireline tool implementation. The discussion provides for rotation of the tool (and its antennas), but multi-component antenna measurements can be used to obtain virtually-steered antenna measurements without requiring rotation of the tool or antennas. It is intended that the following claims be interpreted to embrace all such variations and modifications.

What is claimed is:

1. A method for detecting a conductive feature from within a borehole, the method comprising:
    transmitting an electromagnetic signal from a transmit antenna on a drilling collar or a downhole logging tool;
    measuring a parallel response signal with a first receive antenna parallel to the transmit antenna and a perpendicular response signal with a second receive antenna perpendicular to the transmit antenna, both receive antennas on the drilling collar or the downhole logging tool;
    repeating said transmitting and measuring to obtain an azimuthal dependence of said parallel response signal and said perpendicular response signal;
    determining a diagonal component of said azimuthal dependence for each response signal; and
    estimating a distance to a casing string using the diagonal component of each response signal.

2. The method of claim 1, wherein said estimating the distance to the casing string further comprises fitting a sinusoid to each diagonal component.

3. The method of claim 1, wherein the perpendicular response signal's diagonal component at bin $\beta_i$ is proportional to $$\frac{V_{pp}(\beta_i) - V_{pp}\left(\beta_{i \pm \frac{N}{2}}\right)}{2}$$

where $V_{pp}(\beta_i)$ represents a perpendicular response signal measurement associated with an azimuthal bin $\beta_i$ and $V_{pp}(\beta_{i \pm N/2})$ represents a perpendicular response signal measurement associated with a bin 180° away from azimuthal bin $\beta_i$.

4. The method of claim 1, wherein the parallel response signal's diagonal component at bin $\beta_i$ is proportional to $$\frac{V_{pr}(\beta_i) + V_{pr}\left(\beta_{i \pm \frac{N}{2}}\right)}{2}$$

where $V_{pr}(\beta_i)$ represents a parallel response signal measurement associated with an azimuthal bin $\beta_i$ and $V_{pr}(\beta_{i \pm N/2})$ represents a parallel response signal measurement associated with a bin 180° away from azimuthal bin $\beta_i$.

5. The method of claim 1, wherein the perpendicular response signal's cross component at bin $\beta_i$ is proportional to $$\frac{V_{pp}(\beta_i) + V_{pp}\left(\beta_{i \pm \frac{N}{2}}\right)}{2}$$

where $V_{pp}(\beta_i)$ represents a perpendicular response signal measurement associated with an azimuthal bin $\beta_i$ and $V_{pp}(\beta_{i \pm N/2})$ represents a perpendicular response signal measurement associated with a bin 180° away from azimuthal bin $\beta_i$.

6. The method of claim 1, wherein the distance to the casing string is proportional to $$\frac{V_x^x - V_y^y}{V_x^x + V_y^y}$$

where $V_x^x$ is the x-axis component of both the measured parallel and perpendicular response signals to the x-axis component of the transmitted electronic signal and $V_y^y$ is the y-axis component of the measured parallel and perpendicular response signals to the y-axis component of the transmitted electronic signal.

7. The method of claim 1, further comprising determining a casing string direction from the downhole logging tool.

8. The method of claim 7, wherein said determining of the casing string direction further comprises fitting a sinusoid to the perpendicular signal's cross component.

9. The method of claim 7, wherein said determining of the casing string direction further comprises fitting a sinusoid to the parallel signal's diagonal component and to the perpendicular signal's diagonal component.

10. The method of claim 1, wherein the first and second receive antennas and the transmit antenna are each tilted relative to an axis of the logging tool.

11. A downhole ranging tool that comprises:
a rotational position sensor;
a transmit antenna to transmit an electromagnetic signal into a surrounding formation;
a first receive antenna, parallel to the transmit antenna, to measure a parallel response signal from the surrounding formation;
a second receive antenna, perpendicular to the transmit antenna, to measure a perpendicular response signal from the surrounding formation; and
at least one processor that:
determines average response signals from each of multiple rotational positions;
extracts a diagonal component of said azimuthal dependence for each response signal; and
estimates a distance to a casing string using the diagonal component of each response signal.

12. The tool of claim 11, wherein the at least one processor estimates the distance to the casing string at least in part by fitting a sinusoid to each diagonal component.

13. The tool of claim 11, wherein the perpendicular response signal's diagonal component at bin $\beta_i$ is proportional to $$\frac{V_{pp}(\beta_i) - V_{pp}\left(\beta_{i \pm \frac{N}{2}}\right)}{2}$$

where $V_{pp}(\beta_i)$ represents a perpendicular response signal measurement associated with an azimuthal bin $\beta_i$ and $V_{pp}(\beta_{i \pm N/2})$ represents a perpendicular response signal measurement associated with a bin 180° away from azimuthal bin $\beta_i$.

14. The tool of claim 11, wherein the parallel response signal's diagonal component at bin $\beta_i$ is proportional to $$\frac{V_{pr}(\beta_i) + V_{pr}\left(\beta_{i \pm \frac{N}{2}}\right)}{2}$$

where $V_{pr}(\beta_i)$ represents a parallel response signal measurement associated with an azimuthal bin $\beta_i$ and $V_{pr}(\beta_{i \pm N/2})$ represents a parallel response signal measurement associated with a bin 180° away from azimuthal bin $\beta_i$.

15. The tool of claim 11, wherein the perpendicular response signal's cross component at bin $\beta_i$ is proportional to $$\frac{V_{pp}(\beta_i) - V_{pp}\left(\beta_{i \pm \frac{N}{2}}\right)}{2}$$

where $V_{pp}(\beta_i)$ represents a perpendicular response signal measurement associated with an azimuthal bin $\beta_i$ and $V_{pp}(\beta_{i \pm N/2})$ represents a perpendicular response signal measurement associated with a bin 180° away from azimuthal bin $\beta_i$.

16. The tool of claim 11, wherein the distance to the casing string is proportional to $$\frac{V_x^x - V_y^y}{V_x^x + V_y^y}$$

where $V_x^x$ is the x-axis component of the measured parallel and perpendicular response signals to the x-axis component of the transmitted electronic signal and $V_y^y$ is the y-axis component of the measured parallel and perpendicular response signals to the y-axis component of the transmitted electronic signal.

17. The tool of claim 11, wherein the at least one processor further determines a casing string direction from the downhole logging tool.

18. The tool of claim 17, wherein the at least one processor determines the casing string direction at least in part by fitting a sinusoid to the perpendicular response signal's cross component.

19. The tool of claim 17, wherein the at least one processor determines the casing string direction at least in part fitting a sinusoid to the parallel response signal's diagonal component and to the perpendicular response signal's diagonal component.

20. The tool of claim 11, wherein the first and second receive antennas and the transmit antenna are each tilted relative to an axis of the logging tool.

* * * * *